United States Patent [19]

Akkerman

[11] 4,188,011
[45] Feb. 12, 1980

[54] SPOOL VALVE AND PILOT INTERFACE ASSEMBLY

[75] Inventor: Neil H. Akkerman, New Orleans, La.

[73] Assignee: Baker Cac, Inc., Belle Chase, La.

[21] Appl. No.: 943,027

[22] Filed: Sep. 18, 1978

Related U.S. Application Data

[62] Division of Ser. No. 841,951, Oct. 13, 1977.

[51] Int. Cl.² .......................................... F16K 31/122
[52] U.S. Cl. .................................................. 251/63.4
[58] Field of Search ........... 137/456, 458, 461, 596.18; 251/63.4

[56] References Cited

U.S. PATENT DOCUMENTS

| | | | |
|---|---|---|---|
| 3,007,492 | 11/1961 | Grimmer | 137/596.18 |
| 4,073,466 | 2/1978 | Snyder | 251/63.4 |

*Primary Examiner*—Gerald A. Michalsky
*Attorney, Agent, or Firm*—William C. Norvell, Jr.

[57] ABSTRACT

An interface assembly is provided for operation with the spool valve elements comprising means which are extendable to the spool and a piston head element within the housing and carried around the extension means for travel along the extension means in response to pressure variation. Spherical means are securable on the piston head together with means for urging the spherical means toward the spool extension means. First and second camways are defined on the extension means for travel of the spherical means which are secured on the piston. A shoulder on the extension means defines the intersection between the first and second camways and resists travel of the piston-housed spherical means along one of the camways when the piston is shifted in a first direction. The piston head is shiftable in a first direction in response to fluid variation for travel along the spool extension for transfer of the spherical means within the piston from one camway to the other camway without movement of the spool within the housing. The piston head is shiftable in a second direction in response to second pressure variation for interface with the spherical elements carried in the piston with the shoulder and carriage of the spool to shift the spool to another position to vary the fluid flow path through the spool valve. The present apparatus may be utilized to manipulate, for example, a downhole safety valve between open and closed position in response to signal variation indicating abnormal well flow, or the like.

6 Claims, 5 Drawing Figures

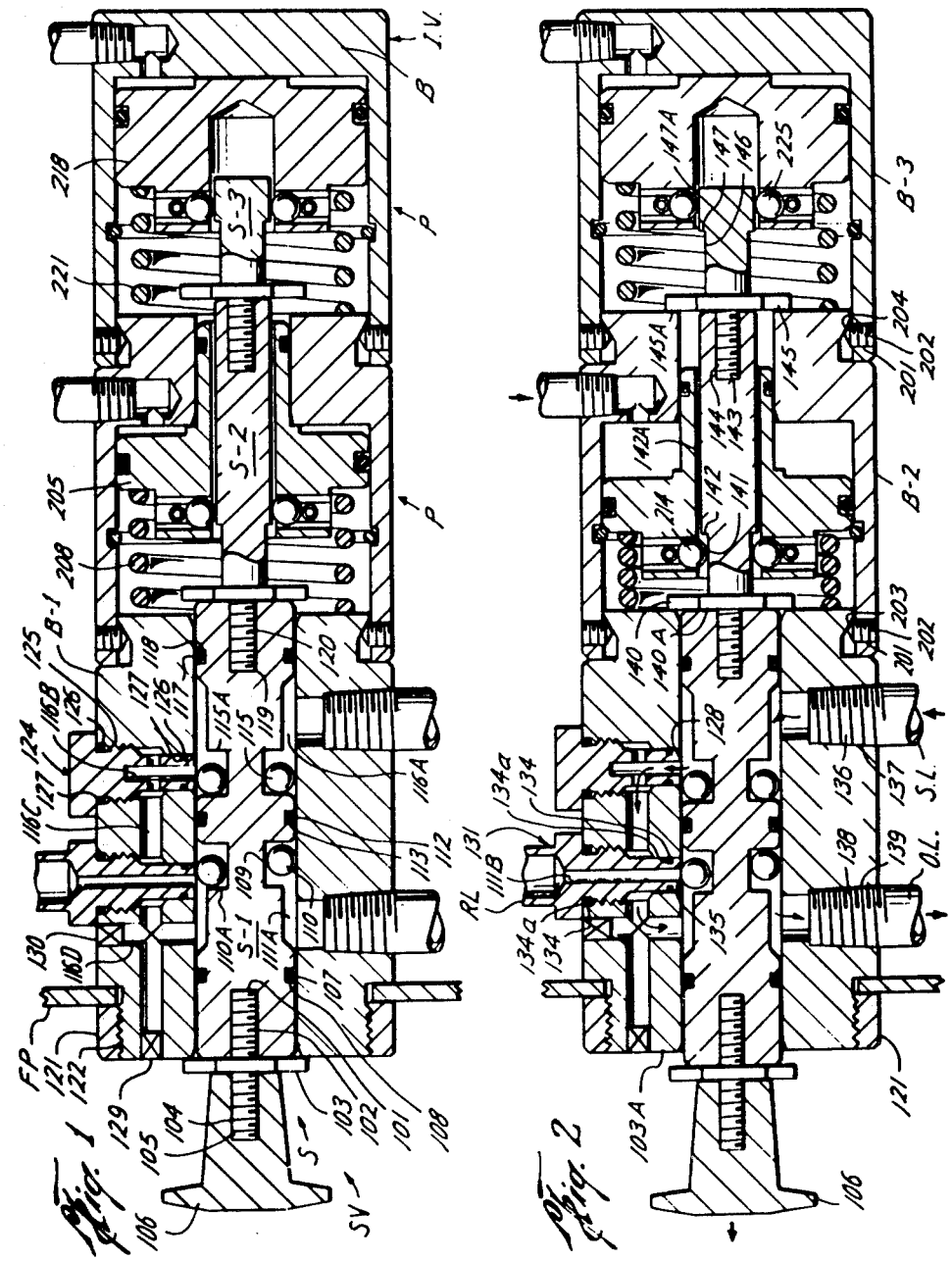

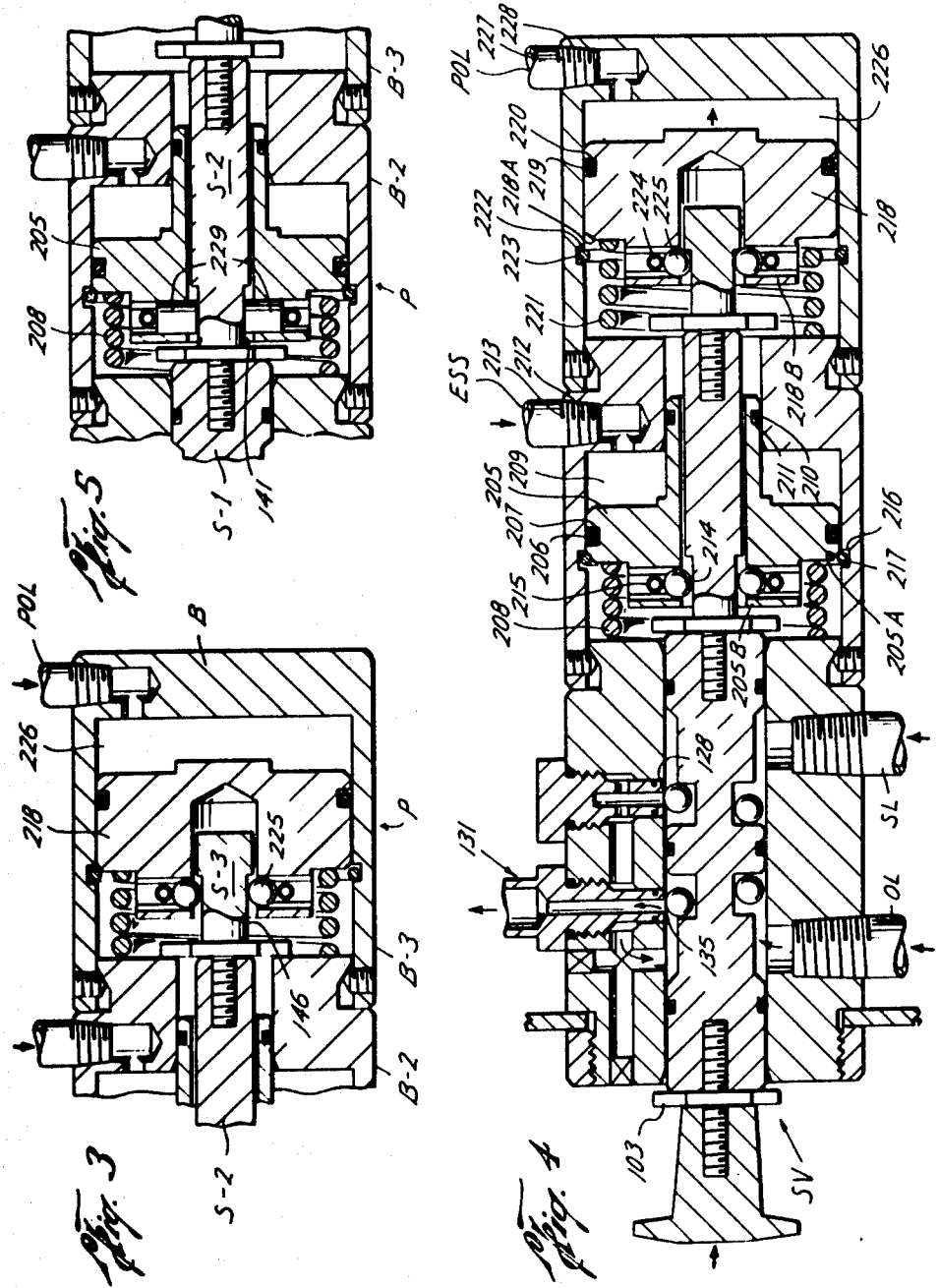

SPOOL VALVE AND PILOT INTERFACE ASSEMBLY

CROSS-REFERENCE TO RELATED APPLICATION

This application is a divisional application of copending Ser. No. 841,951, filed Oct. 13, 1977, entitled "SPOOL VALVE AND PILOT INTERFACE ASSEMBLY."

BACKGROUND OF THE INVENTION

1. Field of the Invention

The present invention relates to a spool valve and pilot interface assembly whereby a spool element in the spool valve is manipulatable to selectively wipe off of sealing engagement a sphere held onto its seat by differential pressure, the movement of the spool and the wiping action causing substantially immaterial resistance to spool movement at the ball-seat interface. The pilot for the spool valve receives a fluid detection signal, which, upon decrease, shuttles the spool to reverse flow through the spool valve. Preferably, the spool valve receives hydraulic control fluid, while the pilot assembly is responsive to pneumatic signal.

2. Description of the Prior Art

As a safety precaution, oil and gas wells are required to contain one or more downhole safety valves, which are typically of ball-type construction and are manipulated between open and closed position by variation of hydraulic control pressure. The safety valve is manipulatable to closed position when detection devices immediate the well respond to an unfavorable condition, such as an increase in temperature, indicating a fire, or by abnormal increase or decrease in well production flow, indicating a flow line plug or rupture. The monitoring devices transmit the abnormal signal to a device which causes automatic loss of hydraulic control fluid to the safety valve, and the safety valve is manipulatable to closed position.

Interfacing mechanisms heretofore utilized have incorporated pressure unbalanced poppet-type valving mechanisms because spool valves having very close tolerance metal sleeves result in high friction being encountered across the valve as the head is shifted with respect to its seat. Thus, it would be desirable to have a bi-stable valving mechanism which is not pressure unbalanced and which does not encounter friction as the head is moved relative to the seat.

Some prior art hydraulic-pneumatic interface valves, that is, an assembly operating one of pneumatic and hydraulic control source which is responsive to the other of pneumatic and hydraulic source in a second signal, are pressure unbalanced and require pneumatic signal to allow hydraulic pressure to the downhole safety valve. In these systems, the pneumatic source is typically tapped from the well, so that when the well is shut in, there is no source of control fluid to reopen the valves. This, in turn, has required utilization of mechanical defeat mechanisms or hand pumps to activate the system to manipulate the valve again to open position. These start-up techniques, if not mechanically released, will defeat the entire safety system.

Valving mechanism heretofore known and utilized have required the incorporation of numerous valves and complicated circuitry. The multiplicity of valves has been utilized to interface many sensing signals, usually at a minimum of one valve per signal. In these systems, manual valves are required to by-pass sensing signals for start-up. Additionally, other manual valves are required to shut down the system. Frequently, hand pumps or mechanical defeat mechanisms have been required to start up the systems. Not only are these valving systems complicated, but they are expensive, result in frequent service problems, and, because of their complexity, have a higher probable failure rate, and are thus unreliable.

Some prior art valving means have utilized spherical elements which essentially act as a valve head which is selectively movable onto and off of an adjacent seat by means of a spool element which is shuttled to manipulate a spherical element. For example, U.S. Pat. No. 2,574,335 discloses two sets of two ball elements each which are opened and closed at the same time in a fluid pressure motor device for control systems. The shuttle device contains a conical carrier surface manipulating a first ball on the conical or bevelled surface to move an enlarged ball thereon between open and closed position within flow passageways.

U.S. Pat. No. 2,891,518 utilizes spherical or ball elements which are not normally free traveling or sealingly engageable upon a seat by differential pressure caused by fluid flow.

U.S. Pat. No. 2,967,544 also is typical of the prior art utilizing spherical elements as a valve head. This patent utilizes compressed spring elements and a mechanical manipulator to shift the balls between opened and closed position with respect to their ports. The spherical or ball elements are not carried by a spool which is shuttleable.

U.S. Pat. No. 3,007,492 discloses a pilot valve for fluid flow systems utilizing a spherical or ball element as the valve head. The ball elements are contained within a shuttleable spool element which is only shuttleable by exertion of a spring element in one direction. A piston head in a piston chamber is utilized to shuttle the spool in the opposite direction against the spring.

U.S. Pat. No. 3,053,279 discloses a directional valve containing a plurality of ball elements manipulatable by a spool to control flow from a second passageway to a first passageway. In one position of the spool, all of the balls are positionable on each of the respective seats. This valve is utilized to control flow from a second passageway to a first passageway, and flow therebetween is controlled by the positioning of a ball within the first passageway.

The present invention obviates the problem set forth above and differs substantially from the prior art. The present invention allows as many sensing signals as desired to control downhole safety valves, or the like, without affecting manual control. Additionally, the present invention does not require bypass valves, mechanical defeat devices, or hand pumps for system start-up. Additionally, the present invention does not rely upon pressure unbalanced poppet-type valve mechanisms, but provides a bi-stable valve which tolerates exposure to high pressures. Additionally, the present invention provides a pressure balanced system which permits easy manual or mechanical shifting of the valve elements. Moreover, the present invention differs substantially from the prior art by utilization of a spool element containing spherical or ball means carried thereby which are selectively engageable onto and wipable off of their respective seats. In addition, the present invention provides a pilot assembly which may be activated without affecting the positioning of the spool, but which is responsive to shift the spool to reverse flow within the spool element. In the present invention, flow must be controlled by positioning of a plurality of ball elements on a plurality of seats, and the use of one ball element on one seat is insufficient. Moreover, in the present invention, many pneumatic or hydraulic signals may be applied to one hydraulic control device, thus simplifying the entire control system.

SUMMARY OF THE INVENTION

The present invention utilizes an interface valve consisting of a spool element which is manipulated by hand or mechanical means in a first direction and is responsive to a second source of fluid pressure or mechanical means to shift the spool in a second direction. The spool valve assembly is preferably responsive to a source of hydraulic fluid and contains spherical free traveling elements carried by the spool means and shiftable by the spool means between open and closed positions relative to their seats to manipulate flow passageways through the spool valve assembly. The spool is manipulated in one direction opposite that of the direction singularly manipulated by hand or mechanical means, by response to, preferably, pneumatic signal, indicating an intolerable variance in well pressure, temperature, or the like, to shift the spool to a position to reverse fluid flow through the spool valve to manipulate a safety valve or other mechanism to isolate fluid flow within a subterranean oil or gas well or the like. The present invention permits an infinite number of pilots to be stacked in series within the assembly so that any given pilot may initiate shifting of the spool element. In an optional embodiment, the invention provides a pilot assembly which requires clearance before the spool element is initially manipulated to open the downhole safety valve.

BRIEF DESCRIPTION OF THE DRAWINGS

FIG. 1 is a sectional view illustrating the spool valve and pilots in the quiescent state.

FIG. 2 is a sectional view similar to that illustrated in FIG. 1, showing the interface valve subsequent to manual manipulation for transmission of control fluid through the spool valve, the flow path therethrough being indicated by arrows. FIG. 2 additionally illustrates an emergency shutdown signal being received within the central pilot body element.

FIG. 3 is a partial sectional view of the second or outer pilot body showing receipt therein of a signal through a pneumatic pilot output line with the smaller outer diameter portion of the spool defining a camway for the ball element of the piston.

FIG. 4 is a sectional view of the interface valve similar to that shown in FIGS. 1 and 2, subsequent to loss or reduction of pneumatic pilot output signal within the second or outer pilot body with the balls being secured onto and carrying the spool element. The spool valve is illustrated in position to isolate supply pressure and permit fluid within the output line from the safety valve to be bled through the spool valve.

FIG. 5 is a partial sectional view of the central pilot body element with the piston head carrying a non-retractable pin or block element along the smaller diametric portion of the spool, as an alternative embodiment.

DESCRIPTION OF THE PREFERRED EMBODIMENTS

As illustrated in the Figs., an interface valve I.V. is comprised of an outer cylindrical elongated body B containing within one end thereof a spool valve assembly SV and within the other end thereof a plurality of pneumatically responsive pilots P. The spool valve assembly SV, in turn, is comprised of elongated spool sections S1, S2 and S3.

The spool section S1 receives through a bore 101 by means of threads 102 an outwardly protruding shoulder device 103 which, in turn, receives through a similar bore 104 by means of threads 105 a manipulator 106 which is adapted to be operated by hand. The spool section S1 is secured at the end opposite the manipulator 106 to a functionally extendable elongated spool section S2 received within a bore 119 of the spool section S1 by means of threads 120, the spool section S2, in turn, receiving a further extendable spool section S3 received within a bore 143 of the spool section S2 by means of threads 144.

The spool section S2 has defined thereon an outer spool shoulder element 140 the outer diameter of which is considerably enlarged over the outer diameter of the elongated section S2, the shoulder 140 having a smooth face 140a for resistant interface with the spool valve body B-1. The spool section S3 also has a similar spool shoulder 145 and face 145a which are similarly functional with the pilot body element B2.

O-rings 107, 112 and 117 are incrementally spaced along the exterior of the spool section S1 within their respective grooveways 108, 113 and 118 defined within the spool section S1 to prevent fluid communication between the spool section S1 and the spool valve body B1. Between the rings 107 and 112 is an indented camway 109 defined on the spool section S1 for receipt of and free travel of a plurality of spherical ball elements 110 received within the groove 109 between the spool section S1 and the spool valve body B1. Similr spherical ball elements 115 are housed within a groove 114 defining a camway between the rings 112 and 117.

A supply pilot assembly 124 is secured through the spool valve body B1 by means of threads 125, the pilot assembly 124 providing elastomeric ring elements 126 each carried within a groove 127 on the pilot 124 to prevent fluid communication between the pilot 124 and the spool valve body B1. On the interior end of the pilot 124 is an engrooved seat 128 for complementary selective sealing engagement with the outer periphery of the spherical ball elements 115. The supply pilot 124 defines a flow passageway 116b therethrough which is selectively communicable with a flow passageway 116a defined around the spherical elements 115 and immediately exterior of the spool section S1 between the rings 112 and 117, the passageway 116b also always communicating with a continual passageway 116c in the body B1 which, in turn, is defined exteriorally around a return pilot assembly 131 which is secured within the spool valve B1 by means of threads 132. The passageway 116c continues around the return pilot 131 by means of passageway 116d defined within the spool valve body B1 which, in turn, communicates with the fluid passage 111A immediate the spherical ball elements 110 between the ring members 107 and 112.

The return pilot 131 receives a return line RL for entrapment of discharged control fluid as described hereafter. The return pilot 131 also has defined therethrough a passage 111b always in communication with the return line RL and having at its interior innermost end within the spool valve body B1 an open seal seat 135 of substantially the same construction as the seat 128 within the supply pilot 124, the seat 135 selectively receiving the outer sealing surface of one of the balls 110 to isolate the passage 111b from the passage 111a. Elastomeric seal rings 134, each contained within a bore 134a on the return pilot 131 prevent fluid communication between the pilot 131 and the housing B1.

The spool valve SV also contains within the body B1 an output line OL which communications with, for example, a downhole safety valve, an hydraulic actuator for a gate valve, or the like, the output line OL being received within a bore 139 within the body B1 by means of threads 138. A similar line SL always is in fluid communication with a supply of control fluid and is received through the spool valve body B1 and within a bore 137 therefor and being secured to the body B1 by means of threads 136.

The interface valve I.V. is illustrated as secured within a control panel (not shown) by means of a face plate FP which is secured around the valve I.V. by means of a circular lock ring 121 which is secured to the spool valve body B1 by means of threads 122.

Plug elements 129 and 130 are inserted through the spool valve body B1 to isolate each of the ends of passages 116c and 116d from the exterior of the interface valve I.V.

The spool section S2, which is connected by threads 120 to the spool section S1, has defined thereon a circular grooveway 141 of a smaller outer diameter than the outer diameter of the remaining portion of the spool section S2. The groove 141 selectively receives the exterior of ball elements 214 when they are permitted to travel thereon as described below, the groove 141 terminating in a resistant wall or shoulder 142 which defines the outer diameter of the grooveway 141 and a companion camway 142a on the exterior of the spool section S2. The spool section S3 contains a similar outer diameter grooveway 146 together with a similar resistant shoulder 147 and a camway 147a.

As shown in the drawings, the pilots P are a plurality of elements, the elements having cylindrical bodies B2 and B3.

The first or central pilot body B2 and the second or outer pilot body B3 are attached to the spool valve body B1 and the pilot body element B2, respectively, by means of an inwardly extending pin element 202 secured through the body B at threads 201, the first or central pin 202 interfacing with an outwardly skirting bevel 203 defined on the spool valve body B1 and the second or outer pin 202 interfacing with a similar bevel 204 on the pilot body element B2, the configuration of the pins 202 and the bevels 203 and 204 permitting each of the pilot bodies B2 and B3 to be rotatably manipulated with respect to the spool valve body B1 in order to provide convenient alignment of pilot output lines and/or emergency shutdown signal sources POL and ESS through the body B.

The pilot body B2 receives within a bore 212 an emergency shutdown signal line ESS secured through the bore 212 by means of thread 213. The line ESS always communicates with a chamber 209 interior of the pilot body B2. Immediate the chamber 209 is a piston head 205 which receives axially therethrough the spool section S2. O-rings 206 and 210 are housed within their respective grooveways 207 and 211 defined on the piston head 205 to prevent fluid communication between the piston head 205 and the pilot body B2. The piston head 205 is normally urged away from the spool valve body B1 by means of a compressable spring element 208 housed within the pilot body B2 between the piston head 205 and the spool valve body B1. The frontal face 205b of the piston head 205, or that portion of the piston head 205 away from the chamber 209, houses a ring-like circular garter spring element 215 normally downwardly urging and grasping upon a series of ball or spherical elements 214 housed within the face 205b, the balls 214 selectively travelable along the camway 142a and the grooveway 141 on the exterior of the spool section S2. As pressure is increased within the chamber 209, as described below, the piston head 205 will be caused to travel along the spool valve body B1 as the compressive force defined through the spring 208 acting on the piston head 205 is overcome, the travel of the piston head 205 toward the spool valve body B1 being limited by interface of a circular and interiorally protruding wire element 217 defined within a grooveway 216 in the body B of the pilot body element B2, the wire element 217 interfaceable with a companion shoulder 205a on the piston head 205 to act as a stop for the piston head 205 travel in one direction.

The pilot body B3 is of substantially the same construction and arrangement as the pilot body B2. A pilot output line POL is shown within a bore 228 on the body B by means of threads 227, the signal within the line POL being receivable within a chamber 226 interior of the body B. A piston head 218 is slidably received within the body B in the pilot body B3 and has defined thereon an elastomeric ring elment 219 housed within a groove 220 to prevent fluid communication between the piston head 218 and the body B. A garter spring 224, of substantially the same design as the spring 215, is carried around a plurality of spherical ball elements 225 within the frontal face 218b of the piston 218, the spring 224 serving to urge the balls 225 onto the spool section S3 when pressure within the chamber 226 causes movement of the piston 218 toward the pilot body B2, as described below. The piston 218 normally is held in contracted position by a compressable spring element 221 housed between the spool section S3 and the pilot body B2. An inwardly extending wire element 223 housed within a grooveway 222 in the body B of the pilot element B3 will interface with a companion shoulder 218a on the piston 218 to define the limit of expansion of the piston 218 when pressure within the chamber 226 is increased and overcomes the resistance afforded by the spring 221.

OPERATION

Prior to operation, the supply line SL is affixed through the bore 137 of the spool valve body B1 and is communicable with a source of hydraulic fluid and pressure. The output line OL is affixed to the spool valve body B1 through the bore 139 to the hydraulically activatable component, such as a downhole safety valve located within a subteranean oil or gas well. The return line RL communicates with the return pilot 131 and may be a fluid container, other entrapping device, or may simply be exposed to the atmosphere or environment. The pilot output line POL, which may be pneumatic or hydraulic, is inserted through the bore 228 within the body B of the pilot body element B3 and is communicable with a source of pneumatic signal transmittable through the line during for example, normal operation and flow of the well while the downhole safety valve is the open position. The emergency shutdown signal lines ESS is threadedly secured within the bore 212 in the body B of the pilot body element B2 and is communicable with an auxiliary pneumatic signal source which is responsive to one or more indicators identifiable with abnormal or emergency well conditions requiring immediate manipulation of the safety valve to closed position.

It should be noted that the interface valve I.V. initially is in the quiescent state, illustrated in FIG. 1, even though the emergency shutdown signal source ESS is shown as having been charged such that increased pressure within chamber 209 has acted upon the piston head 205 and has overcome the resistance afforded by the spring 208, wherby the piston head 205 has shifted to expanded position such that the balls 214 have traveled along the camway 142a and are permitted to travel within the grooveway 141 with the spring 215 snuggly containing the balls 214 along the grooveway 141. It should be noted that the interface of the wire 217 and the shoulder 206a prevents further travel of the piston 205 so the piston head 205 never contacts the spool shoulder 140 to move it to the face 140a of the spool valve body B1. Accordingly, even though the piston head 205 has been shifted, the spool section S1 will not be manipulated and the flow path of fluid within the spool valve SV is not altered. In this quiescent state, the spool section S1 is positioned such that the shoulder 115a is away from the seat 128 so that one of the normally free traveling ball elements 115 may become sealingly engaged onto its companion seat 128 on the supply pilot 124 to isolate the flow passages 116a and 116b when fluid is delivered through the supply line SL, the pressure differential defined by the higher pressure within passage 116a and the lower pressure within the passage 116b and the fluid flow thereacross causing one of the balls 115 to seek and become sealingly engaged on its seat 128. Also, in this position, all of the normally free traveling ball elements 110 are prevented from seeking the seat 135 on the internal end of the return pilot 131 by means of the positioning of the shoulder 110a on the spool section S1 immediate and partially across the seat 135.

When it is desired to transmit control pressure through the interface valve I.V., to, for example, open a downhole safety valve, the hand manipulator 106 is grasped and urged away from the face plate FP whereby the spool sections S1, S2 and S3 are shifted concurrently and proportionately therewith. As the spool sections are shifted, the shoulder 115a on the spool section S1 moves toward the balls 115 and prevents them from becoming sealingly engaged upon the seat 128. Moreover, the shifting of the spool sections also repositions the shoulder 110a of the spool section S1 slightly away from the seat 135 to permit one of the free traveling balls 110 within the groove 109 to thereafter seek the seat 135 when control fluid is transmitted through the line SL. When the spool sections are thus shifted to the position shown in FIG. 2, fluid flow is initiated and will be transmitted from the supply line SL, through the passages 116a, 116b, 116c, 116d and 111a and to the output line OL to manipulate the downhole safety valve to open position. When this flow occurs, a pressure differential will be defined between the passage 111a and 111b which will cause one of the balls 110 which has seeked the seat 135, to become sealingly engaged and held thereupon, thus preventing discharge of fluid through the return line RL.

As the hand manipulator 106 is pulled away from the face plate FP, outward manipulation of the spool sections is limited by the interface of the spool shoulders 140 and 145, on the faces 140a and 145a, respectively.

It should be noted that manipulation of the spool sections as above described does not affect the positioning of the balls 214 and 225 on sections S2 and S3, respectively, the shoulders 140 and 145 contacting the faces 140a and 145a, respectively, before any of the balls 214 contact the resistance face 142 on the spool section S2, the camway 147a sliding underneath and away from the balls 225 in the pilot body element B3. The manipulation of the interface valve I.V. as above described now places the valve I.V. in normal operating mode, as illustrated in FIG. 2, for transmission of fluid from the line SL through the spool valve SV and within the line OL to manipulate the downhole valve to open position.

Subsequent to the opening of the downhole safety valve, the pneumatic pilot output line POL will, accordingly, transmit a signal increase which will be received through the pilot body element B3 and will cause resistance afforded by the spring 221 to be overcome and the piston 218 thus is shifted toward the spring 221. As the piston 218 is shifted, the balls 225 will travel along the camway 147a, dropping into the groove 146 as the piston 218 continues movement, the garter spring 224 snuggly engaging onto the balls 225 to maintain them around the groove 146. Continued travel of the piston 218 is prevented at the interface of the wire 223 with the shoulder 218a of the piston 218. Again, it should be noted that shifting of the piston 218 and positioning of the ball elements 225 on the groove 146 does not affect the positioning of the spool sections S1 or the operation of the spool valve SV. The positioning of the piston 218 and the balls 225 subsequent to increase in pressure within the pneumatic pilot output line POL is as illustrated in FIG. 3.

It should be noted that the spool section S-1 may be hand or mechanically manipulated at any time in either direction regardless of the positioning of the pistons and balls in any of the pilots.

In the event that the pneumatic pilot output line POL detects an abnormal well condition requiring immediate closure of the downhole safety valve to prevent a well blowout, pressure within the line POL will be lost because of, for example, activation of a euctectically activatable component within the line POL, and the chamber 226 will become contracted by the shifting of the piston 218 along the spool section S3, the piston 218 being urged toward the chamber 226 by means of the force defined within the compressed spring element 221. As the piston 218 is shifted, the balls 225 which are housed within the piston face 218b, will travel along the grooveway 146 and, as illustrated in FIG. 4, will contact the resistance face or shoulder 147.

When the balls 225 engage the resistance shoulder 147, the spring 224 encapsulating the balls 225 will maintain the balls upon the resistance shoulder 147 and the spool section S3 now is caused to travel and become shiftable by the force defined through the spring 221 and the piston 218. Accordingly, the spool section S1, being associateably secured to the spool section S3 by means of the spool section S2, thus is urged in the direction of the movement of the spool section S3. As the spool sections are shifted laterally within the spool valve SV, the shoulder 110a contacts the surface of the balls 110 to cause the ball 110 which has been previously sealingly engaged upon the seat 135 to be wipeably removed therefrom. Concurrently, the shoulder 115a has been laterally moved away from the seat 128 on the supply pilot 124 to permit the balls 115 to seek, but not yet engage upon, the seat 128. As the sealingly engaged ball 110 is wiped off of its companion seat 135, the passage 111b within the return line RL will become communicable with both the passage 111a and the output line OL whereby flow of fluid within the output line OL is reversed and is permitted to travel through the passage 111a and the passage 111b to the return line RL. Fluid is thus bled through the from the line OL and the downhole safety valve is manipulated to closed position. When the sealed ball 110 is disengaged from its seat 135, fluid flow will be initiated which will, in turn, result in a pressure differential between the passages 116a and 116b, and cause one of the balls 115 traveling within the passage 116a to seek and sealingly engage upon the seat 128 within the supply pilot 124 to thus isolate fluid flow between the passages 116a and 116b.

As the balls 110 and 115 are repositioned within the spool valve SV, the spool sections S1, S2 and S3 continue lateral shifting until such time as the shoulder 103 of the hand manipulator 106 interfaces with the body B-1. Although the lateral travel of the spool sections S1, S2 and S3 now is prevented by interface of the shoulder 103 and the lock ring 121, the compressed force defined within the spring 221 continues to exert a force and urge the piston 218 to compress the chamber 226. Accordingly, because the spool sections have stabilized against lateral movement, the spring 221 is still acting upon the piston 218, the balls 225 overcome secure engagement on the groove 146 against the resistance face 147 and are permitted to "snap" upwardly immediate the resistance face 147 by overcoming the downward urging of the spring 224 for free travel along the camway 147a until further travel of the piston 218 is prevented by interface of the piston 218 and the outermost end of the pilot body element B3. The positioning of the interface valve I.V. described above is as illustrated in FIG. 4 in transition to the position shown in FIG. 1.

It should be noted that after manipulation of the interface valve I.V. as above described, and as shown in FIG. 4, such that the downhole safety valve is closed, the spool sections S1, S2 and S3 will not shift laterally within the spool valve SV and the pilots P, and the interface valve I.V. must thereafter be manually reset by movement of the spool sections by the hand manipulator 106, thus assuring against inadvertent automatic resetting of the interface valve I.V. to the position as shown in FIG. 2 subsequent to an abnormal well condition being sensed.

As an alternative embodiment, illustrated in FIG. 5, one or more of the pilot body elements B2 and B3 may contain a pin element 229 carried within the piston head. The pilot body element B2 contains a modified piston head 205 which receives a pin element 229 stabilized on the spool section S2 by the pin 215. However, the pin is positioned on the groove 141 of the spool section S2 and, because of the inner rectangular-like configuration of the pin 229, the pin 229 will never be able to clear the resistance shoulder 142 and thus is not permitted to travel along the camway 142a. The compressive force defined within the spring 208 always urges the pin 229 on the groove 141 and immediate the resistance shoulder 142. Accordingly, manual manipulation of the spool sections S1, S2 and S3 by the hand manipulator 106 cannot be accomplished until such time as the pressure transmitted through the emergency signal line ESS and within the chamber 209 causes the piston head 205 to travel laterally as resistance afforded by the spring 208 is overcome. Now, because the chamber 209 is expanded and the piston 205 has been moved, the pin 229 interface with the resistance face 142 will no longer oppose lateral shifting of the spool sections by the hand manipulator 106. Thus, the alternative configuration shown in FIG. 5 requires the establishment of pressure within the pilot body element B2 before the spool valve SV may be manually manipulated. If this signal within the pilot body element B2 is lost, the spool valve SV cannot be manipulated, thus providing a precaution against inadvertent manipulation of the spool sections to transmit fluid to open a safety valve unless and until a safety check or other signal is transmitted within the line ESS.

It should be noted that when the spool sections are manipulated to position the balls 110 and 115 to permit control fluid to pass from the supply line SL, around the spool section S1 and into the output line OL to open the safety valve, there is no differential pressure defined across the center O-ring 112 because the control pressure is equal within each of the passages 111a and 116a, thus permitting the spool sections to be statically stabilized in all positions.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and is desired to be secured by Letters Patent is:

1. In a valve assembly for controling one of pneumatic and hydraulic fluid therethrough, said valve assembly comprising: a housing, a shuttleable spool element therein shiftable from one position to another position, spherical means defining at least one valve head, and valve seat means in said housing for transmission of said fluid and for selective sealing engagement with at least one valve head, the improvement comprising: means extendable to said spool; piston head means within said housing carried around said means extendable to said spool and shiftable along said spool extension means in response to variation in fluid pressure thereon; spherical means securable on said piston head; means for urging said spherical means securable on said piston head towards said means extendable to said spool; first and second camways defined along said means extendable to said spool for travel of said spherical means securable on said piston; and a shoulder on said means extendable to said spool for definition between said first and second camways and for resistance of travel of said spherical means along one of said camways when said piston means is shifted in one direction, said piston head being shiftable in a first direction in response to one of increase and decrease of fluid pressure for travel along said means extendable to said spool to transfer said spherical means from one of said camways to the other of said camways without relative movement between said spool and said housing, said piston head being shiftable in a second direction in response to the other of increase and decrease of fluid pressure for travel along said means extendable to said spool to interface said spherical means with said shoulder and carry said spool to shift said spool to another position.

2. In a bi-positionable valve assembly for controling one of pneumatic and hydraulic fluid therethrough, said valve assembly comprising a housing, a shuttleable spool element therein shiftable from one position to another position, spherical means defining at least one valve head, and valve seat means in said housing for transmission of said fluid and for selective sealing engagement with at least one valve head, the improvement comprising: means extendable to said spool; piston head means within said housing carried around said means extendable to said spool and shiftable with respect to said spool extension means in response to variation in fluid pressure across said piston head; spherical means securable on one of said piston head and said spool extension means; means for urging said spherical means toward the other of said spool extensions means and said piston head means; first and second camways defined along one of said piston head means and said spool extension means for travel of said spherical means; and a shoulder on at least one of said piston head means and said spool extension means for definition between said first and second camways and for resistance of travel of said spherical means along one of said camways when said piston head means is shifted relative to said spool extension means in one direction, said piston head means being shiftable relative to said spool extension means in a first direction in response to one of increase and decrease of fluid pressure for travel relative to said spool extension means to transfer said spherical means from one of said camways to the other of said camways without relative movement between said spool and said housing, said piston head means being shiftable relative to said spool extension means in a second direction in response to the other of increase and decrease of fluid pressure for travel relative to said spool extension means to interface said spherical means with said shoulder and carry one of said spool extension means and said piston head means to shift said one of said spool extension means and said piston head means to another position.

3. In a bi-positionable valve assembly for controlling one of pneumatic and hydraulic fluid therethrough, said valve assembly comprising a housing, a shuttleable spool element therein shiftable from one position to another position, valve head and seat means manipulatable relatively with respect to one another by positioning of said shuttleable spool element, the improvement comprising: means extendible to said spool, piston head means within said housing carried around said means extendible to said spool and shiftable with respect to said spool extension means in response to variation in fluid pressure across said piston head, spherical means securable on one of said piston head and said spool extension means; means for urging said spherical means toward the other of said spool extension means and said piston head means; first and second camways defined along one of said piston head means and said spool extension means for travel of said spherical means; and a shoulder on at least one of said piston head means and said spool extension means for definition between said first and second camways and for resistance of travel of said spherical means along one of said camways when said piston means is shifted relative to said spool extension means in one direction, said piston head being shiftable relative to said spool extension means in a first direction in response to one of increase and decrease of fluid pressure for travel relative to said spool extension means to transfer said spherical means from one of said camways to the other of said camways without relative movement between said spool and said housing, said piston head means being shiftable relative to said spool extension means in a second direction in response to the other of increase and decrease of fluid pressure for travel relative to said spool extension means to interface said spherical means with said shoulder and carry one of said spool extension means and said piston means to shift one of said spool extension means and said piston head means to another position.

4. In a multi-positionable valve assembly for controling one of pneumatic and hydraulic fluid flow therethrough, said valve assembly comprising a housing, a shuttleable spool element shiftable to plural positions within said housing, valve head and seat means manipulatable relatively with respect to one another by positioning of said shuttleable spool element, the improvement comprising: means extendible to said spool, piston head means within said housing carried around said means extendible to said spool and shiftable with respect to said spool extension means in response to variation in fluid pressure across said piston head, spherical means securable on one of said piston head and said spool extension means; means for urging said spherical means toward the other of said spool extension means and said piston head means; first and second camways defined along one of said piston head means and said spool extension means for travel of said spherical means; and a shoulder on at least one of said piston head means and said spool extension means for definition between said first and second camway and for resistance of travel of said spherical means along one of said camways when said piston means is shifted relative to said spool extension means in one direction, said piston head being shiftable relative to said spool extension means in a first direction in response to one of increase and decrease of fluid pressure for travel relative to said spool extension means to transfer said spherical means from one of said camways to the other of said camways without relative movement between said spool and said housing, said piston head being shiftable relative to said spool extension means in a second direction in response to the other of increase and decrease of fluid pressure for travel relative to said spool extension means to interface said spherical means with said shoulder and carry one of said spool extension means and said piston means to shift one of said spool extension means and said piston head means to another position.

5. In a bi-positionable valve assembly for controling one of pneumatic and hydraulic fluid therethrough, said valve assembly comprising a housing, a shuttleable spool element therein shiftable from one position to another position, spherical means defining at least one valve head, and valve seat means in said housing for transmission of said fluid and for selective sealing engagement with at least one valve head, the improvement comprising: means extendible to said spool; piston head means within said housing carried around said means extendible to said spool and shiftable with respect to said spool extension means in response to variation in fluid pressure across said piston head; a camway defined along of one of said piston head means and said spool extension means; blocking means carried by one of said spool extension means and said piston head means for travel along said camway; and a shoulder on at least one of said piston head means and said spool extension means for resistance of free travel of said blocking means along said camway in one direction and for interfacing said piston head means and said spool extension means when said piston head means is shifted relative to said spool extension means in one direction, said piston head means being shiftable relative to said spool extension means in a first direction in response to one of increase and decrease of fluid pressure for travel relative to said spool extension means to shift said blocking means along said camway without relative movement between said spool and said housing said piston head means being shiftable relative to said spool extension means in a second direction in response to the other of increase and decrease of fluid pressure for travel relative to said spool extension means to interface said blocking means with said shoulder and carry one of said spool extension means and said piston head means to shift said one of said spool extension means and said piston head means to another position.

6. In a valve assembly for controling one of pneumatic and hydraulic fluid therethrough, said valve assembly comprising a housing, a shuttleable spool element therein shiftable from one position to at least another position, valve head and seat means manipulatable relatively with respect to one another by positioning of said shuttleable spool element to control fluid flow through said valve assembly, the improvement comprising: means extendible to said spool; piston head means within said housing carried around said means extendible to said spool and shiftable with respect to said spool extension means is response to variation in fluid pressure across said piston head; a camway defined along one of said piston head means and said spool extension means; blocking means carried by one of said spool extension means and said piston head means for travel along said camway; and a shoulder on at least one of said piston head means and said spool extension means for resistance of free travel of said blocking means along said camway in one direction and for interfacing said piston head means and said spool extension means when said piston head means is shifted relative to said spool extension means in one direction, said piston head means being shiftable relative to said spool extension means in a first direction in response to one of increase and decrease of fluid pressure for travel relative to said spool extension means to shift said blocking means along said camway without relative movement between said spool and said housing, said piston head means being shiftable relative to said spool extension means in a second direction in response to the other of increases and decrease of fluid pressure for travel relative to said spool extension means to interface said blocking means with said shoulder and carry one of said spool extension means and said piston head means to shift said one of said spool extension means and said piston head means to another position.

* * * * *